US010043609B2

(12) United States Patent
Ito et al.

(10) Patent No.: US 10,043,609 B2
(45) Date of Patent: Aug. 7, 2018

(54) COOLING STRUCTURE FOR ELECTROMAGNETIC COIL, AND ELECTROMAGNETIC ACTUATOR

(71) Applicants: CKD CORPORATION, Komaki-shi, Aichi (JP); NIKON CORPORATION, Tokyo (JP)

(72) Inventors: Akihiro Ito, Komaki (JP); Masayuki Kouketsu, Komaki (JP); Shigeru Morimoto, Tokyo (JP); Hiromitsu Yoshimoto, Tokyo (JP); Koji Tanaka, Tokyo (JP)

(73) Assignees: CKD Corporation, Komaki-shi, Aichi (JP); Nikon Corporation, Tokyo (JP)

( * ) Notice: Subject to any disclaimer, the term of this patent is extended or adjusted under 35 U.S.C. 154(b) by 19 days.

(21) Appl. No.: 15/061,857

(22) Filed: Mar. 4, 2016

(65) Prior Publication Data
US 2016/0189845 A1 Jun. 30, 2016

Related U.S. Application Data

(63) Continuation of application No. PCT/JP2014/073299, filed on Sep. 4, 2014.

(30) Foreign Application Priority Data

Sep. 4, 2013 (JP) ................................. 2013-182810

(51) Int. Cl.
*H01F 7/08* (2006.01)
*H02K 41/02* (2006.01)
(Continued)

(52) U.S. Cl.
CPC ................. *H01F 7/08* (2013.01); *H01F 5/00* (2013.01); *H01F 7/06* (2013.01); *H01F 27/16* (2013.01);
(Continued)

(58) Field of Classification Search
CPC ... H01F 27/16; H01F 5/00; H01F 7/06; H01F 7/08; H02K 2201/18; H02K 3/24; H02K 41/02; H02K 9/19; H02K 9/22
See application file for complete search history.

(56) References Cited

U.S. PATENT DOCUMENTS

| 4,746,425 A | 5/1988 | Stickler et al. |
| 4,848,262 A | 7/1989 | Freeman |

(Continued)

FOREIGN PATENT DOCUMENTS

| CN | 85201396 U | 1/1986 |
| CN | 101310430 | 1/1986 |

(Continued)

OTHER PUBLICATIONS

Search Report dated Dec. 16, 2014 from International Publication No. PCT/JP2014/073299.

(Continued)

*Primary Examiner* — Bernard Rojas
(74) *Attorney, Agent, or Firm* — Beyer Law Group LLP

(57) ABSTRACT

A cooling structure for a first electromagnetic coil includes the first electromagnetic coil having a space extending in the direction of a predetermined axis Z; a cooling member attached to an end surface, with respect to the direction of the predetermined axis Z, of the first electromagnetic coil and having a flow path for fluid internally formed; and an inlet pipe and an outlet pipe connected, within the space, to an inlet and outlet, respectively, of the flow path of the cooling member and extending through the space to a region outside the electromagnetic coil.

12 Claims, 12 Drawing Sheets

(51) Int. Cl.
  *H02K 9/22* (2006.01)
  *H01F 5/00* (2006.01)
  *H01F 27/16* (2006.01)
  *H01F 7/06* (2006.01)
  *H02K 3/24* (2006.01)
  *H02K 9/19* (2006.01)

(52) U.S. Cl.
  CPC ............... *H02K 9/22* (2013.01); *H02K 41/02* (2013.01); *H02K 3/24* (2013.01); *H02K 9/19* (2013.01); *H02K 2201/18* (2013.01)

(56) References Cited

U.S. PATENT DOCUMENTS

| | | | |
|---|---|---|---|
| 4,864,262 | A | 9/1989 | Deb |
| 4,909,079 | A | 3/1990 | Nishimura et al. |
| 5,008,549 | A | 4/1991 | Crewe |
| 5,525,583 | A | 6/1996 | Aized et al. |
| 5,625,332 | A | 4/1997 | Kamo et al. |
| 6,144,280 | A | 11/2000 | Amada et al. |
| 6,331,810 | B1 | 12/2001 | Jung |
| 6,449,830 | B1 | 9/2002 | Amada et al. |
| 6,972,655 | B2 | 12/2005 | Tobias |
| 8,004,378 | B2 | 8/2011 | Wanner |
| 9,508,476 | B2 | 11/2016 | Kouketsu et al. |
| 2002/0190832 | A1 | 12/2002 | Amada et al. |
| 2004/0036848 | A1 | 2/2004 | Frissen et al. |
| 2004/0231138 | A1 | 11/2004 | Kasahara et al. |
| 2004/0247907 | A1 | 12/2004 | Goda et al. |
| 2006/0024257 | A1 | 2/2006 | Chang et al. |
| 2006/0025257 | A1 | 2/2006 | Tanabe et al. |
| 2006/0170525 | A1 | 8/2006 | Urano et al. |
| 2009/0045683 | A1 | 2/2009 | Vermeulen et al. |
| 2012/0062866 | A1 | 3/2012 | Binnard et al. |
| 2013/0069449 | A1* | 3/2013 | Pharand ............... H02K 41/031 310/12.02 |
| 2013/0069478 | A1 | 3/2013 | Hamer |
| 2014/0002228 | A1 | 1/2014 | Hatanaka et al. |
| 2014/0346778 | A1* | 11/2014 | Arlab N Gabeiras .. F03D 9/002 290/55 |

FOREIGN PATENT DOCUMENTS

| | | |
|---|---|---|
| CN | 1477449 A | 2/2004 |
| EP | 1372035 A2 | 12/2003 |
| JP | S56-147413 | 11/1981 |
| JP | S61-125006 U | 8/1986 |
| JP | S63-220734 | 9/1988 |
| JP | H1-100901 | 4/1989 |
| JP | H3-112641 | 5/1991 |
| JP | H5-315178 | 11/1993 |
| JP | H7-330905 | 12/1995 |
| JP | H10-335768 | 12/1998 |
| JP | 2000-232016 | 8/2000 |
| JP | 2001-305750 | 11/2001 |
| JP | 2002-367834 | 12/2002 |
| JP | 2003-200527 | 7/2003 |
| JP | 2004-342755 | 12/2004 |
| JP | 2005-179408 | 7/2005 |
| JP | 4022181 B | 12/2007 |
| JP | 2012-204440 | 10/2012 |
| JP | 2013-012645 | 1/2013 |
| JP | 2013-161939 | 8/2013 |
| JP | 2013-229211 | 11/2013 |
| KR | 10-19990029592 | 4/1990 |
| KR | 10-20080064217 | 7/2008 |
| KR | 10-20110115847 | 10/2011 |
| TW | 348256 B | 10/1986 |
| TW | 397997 B | 8/1987 |
| TW | 200629307 A | 8/1995 |
| WO | 2012/029998 | 3/2012 |
| WO | 2015/016198 | 2/2015 |

OTHER PUBLICATIONS

Chinese Office Action from Chinese Application No. 201480049039.0 dated May 2, 2017.
Extended European Search Report from European Application No. 14843006.9 dated Apr. 21, 2017.
Korean Office Action from Korean Application No. 10-2016-7008203 dated Mar. 2, 2018.
Search Report dated Sep. 22, 2014 from International Application No. PCT/JP2014/069882.
Written Opinion dated Sep. 22, 2014 from International Application No. PCT/JP2014/069882.
Office Action from U.S. Appl. No. 14/812,922 dated May 5, 2016.
International Search Report from International Application No. PCT/JP2015/084693 dated Feb. 16, 2016.
Written Opinion from International Application No. PCT/JP2015/084693 dated Dec. 20, 2016.
International Search Report from International Application No. PCT/JP2015/084694 dated Feb. 16, 2016.
Written Opinion from International Application No. PCT/JP2015/084694.
International Search Report from International Application No. PCT/JP2015/084695 dated Feb. 16, 2016.
Written Opinion from International Application No. PCT/JP2015/084695.
Written Opinion of the International Preliminary Examination from International Application No. PCT/JP2015/084693 dated Dec. 20, 2016.

* cited by examiner

COOLING STRUCTURE FOR ELECTROMAGNETIC COIL, AND ELECTROMAGNETIC ACTUATOR

CLAIM OF PRIORITY

This application is a Continuation of International Patent Application No. PCT/JP2014/073299, filed on Sep. 4, 2014, which claims priority to Japanese Patent Application No. 2013-182810, filed on Sep. 4, 2013, each of which is hereby incorporated by reference.

BACKGROUND OF THE INVENTION

1. Field of the Invention

The present invention relates to a structure for cooling an electromagnetic coil for use in an electromagnetic actuator, etc.

2. Description of the Related Art

In a cooling structure for such an electromagnetic coil, a plate-like cooling element is attached to an end surface, with respect to the direction of a center axis, of the electromagnetic coil (see Japanese Patent No. 4022181). According to Japanese Patent No. 4022181, an inlet pipe and an outlet pipe for coolant are connected to a cooling element at radially opposite end portions of an electromagnetic coil.

BRIEF DESCRIPTION OF THE INVENTION

The cooling structure described in Japanese Patent No. 4022181 may potentially involve the following problem: in the case where a plurality of electromagnetic coils to which the respective cooling elements are attached are to be disposed in parallel, the inlet pipes and the outlet pipes interfere with one another. Thus, difficulty is encountered in forming a unit in which a plurality of electromagnetic coils are disposed in parallel, or further in disposing the units in parallel.

The present invention has been conceived to solve the problem, and a primary object of the invention is to provide such a structure for cooling an end surface, with respect to an axial direction, of an electromagnetic coil that enables a plurality of the electromagnetic coils to be arbitrarily disposed in parallel.

Aspects of the present invention for solving the above problem, and operation and effects of the aspects will next be described.

A first aspect of the present invention provides a cooling structure for an electromagnetic coil comprises an electromagnetic coil which has a space extending in a direction of a predetermined axis; a cooling member attached to an end surface, with respect to the direction of the predetermined axis, of the electromagnetic coil and having a flow path for fluid internally formed; and an inlet pipe and an outlet pipe connected, within the space, to an inlet and outlet, respectively, of the flow path of the cooling member and extending through the space to a region outside the electromagnetic coil.

According to the above configuration, the electromagnetic coil has the space extending in the direction of the predetermined axis. Furthermore, the cooling member is attached to the end surface, with respect to the direction of the predetermined axis, of the electromagnetic coil, and the cooling member has the flow path for fluid internally formed.

Within the above-mentioned space, the inlet pipe and the outlet pipe are connected to the inlet and outlet, respectively, of the flow path of the cooling member. The inlet pipe and the outlet pipe extend through the space to the region outside the electromagnetic coil. Thus, by utilization of the space formed inside the electromagnetic coil, the inlet pipe and the outlet pipe are connected to the inlet and the outlet, respectively, of the flow path of the cooling member, whereby fluid can be flowed through the flow path. Therefore, a plurality of the electromagnetic coils can be arbitrarily disposed in parallel without involvement of mutual interference of the pipes of the electromagnetic coils.

A second aspect of the present invention provides a cooling structure for an electromagnetic coil comprises a plurality of electromagnetic coils each of which has a space extending in a direction of a predetermined axis and are disposed with their predetermined axes juxtaposed in parallel; a cooling member attached to end surfaces, with respect to the direction of the predetermined axes, of the plurality of electromagnetic coils and having a flow path for fluid internally formed; an inlet pipe connected, within the space of any one of the electromagnetic coils, to an inlet of the flow path of the cooling member and extending through the space to a region outside the electromagnetic coil; and an outlet pipe connected, within the space of any one of the electromagnetic coils, to an outlet of the flow path of the cooling member and extending through the space to a region outside the electromagnetic coil.

According to the above configuration, a plurality of the electromagnetic coils are disposed with their predetermined axes juxtaposed in parallel, and the cooling member is attached to the end surfaces, with respect to the direction of the predetermined axes, of the electromagnetic coils. Furthermore, the inlet pipe is connected, within the space of any one of the electromagnetic coils, to the inlet of the flow path of the cooling member, and the outlet pipe is connected, within the space of any one of the electromagnetic coils, to the outlet of the flow path of the cooling member. Thus, by flowing fluid through the flow path of the cooling member, the plurality of electromagnetic coils can be cooled.

In the third aspect of the present invention, the inlet pipe and the outlet pipe are connected to the inlet and the outlet, respectively, within the same space of the electromagnetic coil.

According to the above configuration, the plurality of electromagnetic coils disposed with their predetermined axes juxtaposed in parallel employ a constitution similar to that of the first aspects, whereby the inlet pipe and the outlet pipe can be disposed within a single electromagnetic coil.

A fourth aspect of the present invention provides a cooling structure for an electromagnetic coil comprises a first electromagnetic coil and a second electromagnetic coil each of which has a space extending in a direction of a predetermined axis and which are aligned with the direction of the predetermined axis; a first cooling member attached to an end surface, located opposite the second electromagnetic coil with respect to the direction of the predetermined axis, of the first electromagnetic coil and having a flow path for fluid internally formed; a second cooling member attached to an end surface, located toward the second electromagnetic coil with respect to the direction of the predetermined axis, of the first electromagnetic coil and to an end surface, located toward the first electromagnetic coil with respect to the direction of the predetermined axis, of the second electromagnetic coil and having a flow path for fluid internally formed; and a first inlet pipe and a first outlet pipe connected, within the space of the first electromagnetic coil, to an inlet and an outlet, respectively, of the flow path of the first cooling member and extending through the space of the first electromagnetic coil, through the second cooling member, and through the space of the second electromagnetic coil to a region outside the second electromagnetic coil.

According to the above configuration, the cooling structure comprises the first electromagnetic coil and the second electromagnetic coil each of which has the space extending in the direction of the predetermined axis and which are aligned in the direction of the predetermined axis. In addition to the first cooling member corresponding to the cooling member of the first aspect, the second cooling member is provided between the first electromagnetic coil and the second electromagnetic coil. Furthermore, by utilization of the inside spaces of the first and second electromagnetic coils, the first inlet pipe and the first outlet pipe can be connected to the inlet and the outlet, respectively, of the flow path of the first cooling member while extending through the second cooling member. Thus, even in the case of a configuration in which the first electromagnetic coil and the second electromagnetic coil are aligned in the direction of the predetermined axis, a plurality of groups each consisting of the first electromagnetic coil and the second electromagnetic coil can be arbitrarily disposed in parallel.

In a fifth aspect of the present invention, the cooling structure further comprises a second inlet pipe and a second outlet pipe connected, within the space of the second electromagnetic coil, to an inlet and an outlet, respectively, of the second cooling member and extending through the space of the second electromagnetic coil to a region outside the second electromagnetic coil.

According to the above configuration, even in a configuration in which the first electromagnetic coil and the second electromagnetic coil are aligned with the direction of the predetermined axis, fluid can be flowed to the first cooling member and to the second cooling member.

A sixth aspect of the present invention provides a cooling structure for an electromagnetic coil comprises a plurality of first electromagnetic coils each of which has a space extending in a direction of a predetermined axis and which are disposed with their predetermined axes juxtaposed in parallel; a plurality of second electromagnetic coils each of which has a space extending in the direction of the predetermined axis and which are aligned with the respective first electromagnetic coils in the direction of the predetermined axes; a first cooling member attached to end surfaces, with respect to the direction of the predetermined axes, of the plurality of first electromagnetic coils and having a flow path for fluid internally formed; a second cooling member attached to end surfaces, located toward the second electromagnetic coils with respect to the direction of the predetermined axes, of the plurality of first electromagnetic coils and to end surfaces, located toward the first electromagnetic coils with respect to the direction of the predetermined axes, of the plurality of second electromagnetic coils and having a flow path for fluid internally formed; a first inlet pipe connected, within the space of any one of the first electromagnetic coils, to an inlet of the flow path of the first cooling member and extending through the space of the first electromagnetic coil, through the second cooling member, and through the space of the second electromagnetic coil to a region outside the second electromagnetic coil; and a first outlet pipe connected, within the space of any one of the first electromagnetic coils, to an outlet of the flow path of the first cooling member and extending through the space of the first electromagnetic coil, through the second cooling member, and through the space of the second electromagnetic coil to a region outside the second electromagnetic coil.

The above configuration includes those of the second and fourth aspects and thus can yield actions and effects of the second and fourth aspects.

In a seventh aspect of the present invention, the first inlet pipe and the first outlet pipe are connected to the inlet and the outlet, respectively, within the same space of the first electromagnetic coil.

According to the above configuration, similar to the third aspects, the first inlet pipe and the first outlet pipe can be disposed within a single first electromagnetic coil.

In an eighth aspect of the present invention, the cooling structure for an electromagnetic coil further comprises a second inlet pipe connected, within the space of any one of the plurality of second electromagnetic coils, to an inlet of the flow path of the second cooling member and extending through the space of the second electromagnetic coil to a region outside the second electromagnetic coil, and a second outlet pipe connected, within the space of any one of the plurality of second electromagnetic coils, to an outlet of the flow path of the second cooling member and extending through the space of the second electromagnetic coil to a region outside the second electromagnetic coil.

According to the above configuration, even in a configuration in which a plurality of the first electromagnetic coils are disposed with their predetermined axes juxtaposed in parallel, and the first electromagnetic coils and the second electromagnetic coils are aligned in the direction of the predetermined axes, fluid can be flowed to the first cooling member and to the second cooling member.

In a ninth aspect of the present invention, the second inlet pipe and the second outlet pipe are connected to the inlet and the outlet, respectively, within the same space of the second electromagnetic coil.

According to the above configuration, similar to the third aspect, the second inlet pipe and the second outlet pipe can be disposed within a single second electromagnetic coil.

In tenth aspect of the present invention, a junction pipe is connected, by means of a first seal member, to an outer circumference of an end portion, located opposite the cooling member, of the pipe, and the junction pipe is supported, by means of a second seal member, at an outer circumference of an end portion thereof located opposite the cooling member.

According to the above configuration, the junction pipe is connected, by means of the first seal member, to the outer circumference of an end portion, located opposite the cooling member, of the pipe. Also, the junction pipe is supported, by means of the second member, at the outer circumference of an end portion thereof located opposite the cooling member. Thus, force imposed on the pipe can be mitigated by the first seal member, the junction pipe and the second seal member, thereby restraining imposition of load on a connection between the cooling member and the pipe. Furthermore, since the first seal member and the second seal member allow some movement of the pipe and the junction pipe, errors in connecting the pipe and in connecting the junction pipe can be absorbed.

In an eleventh aspect of the present invention, the cooling member is formed of alumina; the pipe is formed of titanium; and the pipe is connected to the cooling member by silver-soldering by means of a metal layer diffusion-formed on a surface of the cooling member.

According to the above configuration, since alumina and titanium are non-magnetic materials, the cooling member and the pipe can be restrained from affecting magnetic fluxes generated in the electromagnetic coils. Furthermore, the metal layer diffusion-formed on the surface of the cooling member allows the pipe of titanium to be connected to the cooling member of alumina by use of silver solder.

In a twelfth aspect of the present invention, the electromagnetic coil comprises a conductor winding formed by winding a strip conductor by a plurality of turns around the predetermined axis, and the cooling member is attached to an end surface, with respect to the direction of the predetermined axis, of the conductor winding.

According to the above configuration, the electromagnetic coil comprises a conductor winding formed by winding a strip conductor by a plurality of turns around the predetermined axis. Also, the cooling member is attached to an end surface, with respect to the direction of the predetermined axis, of the conductor winding. Thus, the conductor winding can transmit heat, along the entire length in the axial direction, from its end surface to the cooling member, whereby the cooling efficiency of the conductor winding can be improved.

A thirteenth aspect of the present invention, provides an electromagnetic actuator comprises the cooling structure for an electromagnetic coil according to any one of the first to twelfth aspects.

According to the above configuration, the electromagnetic actuator can yield actions and effects similar to those yielded by the above aspects.

In a fourteenth aspect of the present invention, the electromagnetic actuator further comprises a driven member which is disposed opposite the electromagnetic coils with respect to the cooling members and is two-dimensionally driven along the cooling members in response to magnetic fluxes generated in the electromagnetic coils.

According to the above configuration, the electromagnetic actuator further comprises the driven member which is disposed opposite the electromagnetic coils with respect to the cooling members and is two-dimensionally driven along the cooling members in response to magnetic fluxes generated in the electromagnetic coils. Thus, the inlet pipes and the outlet pipes for flowing fluid through the corresponding cooling members cannot be connected to the cooling members at any side positions thereof and at any positions located opposite the electromagnetic coils. In this connection, because of employment of the cooling structure for an electromagnetic coil according to any one of the first to twelfth aspects, even such an electromagnetic actuator allows fluid to flow through the cooling members.

DETAILED DESCRIPTION OF EMBODIMENTS OF THE INVENTION

An embodiment of the present invention will next be described with reference to the drawings. The present embodiment is of an XY linear actuator for use in a lithographic apparatus (stepper) or the like.

Figure 1:
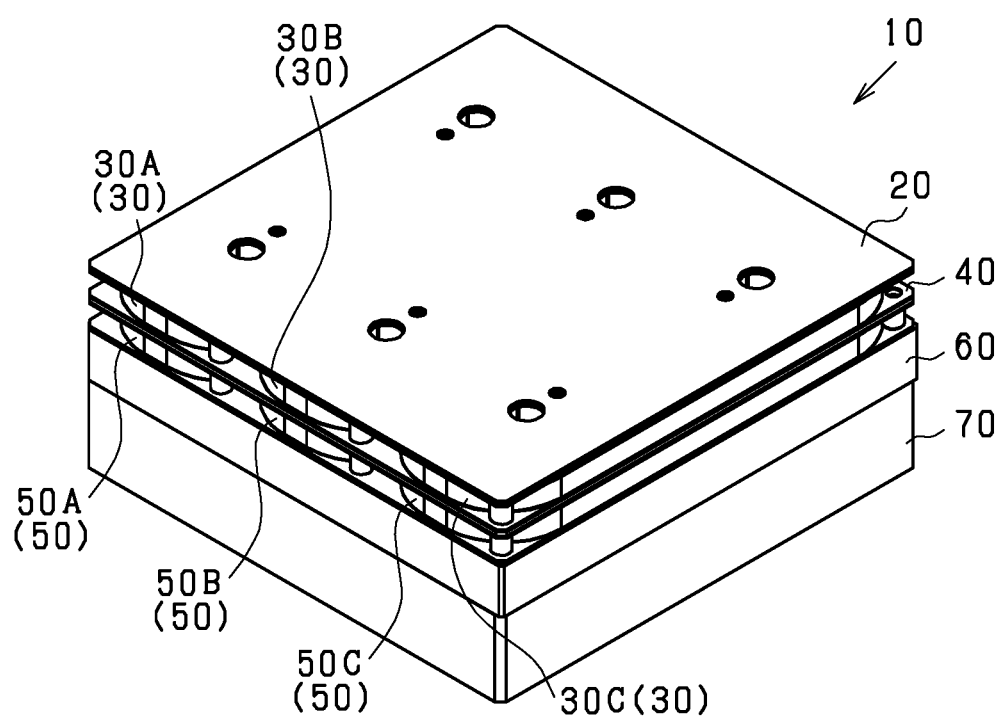
FIG. 1 is a perspective view of a coil unit.
Figure 2:
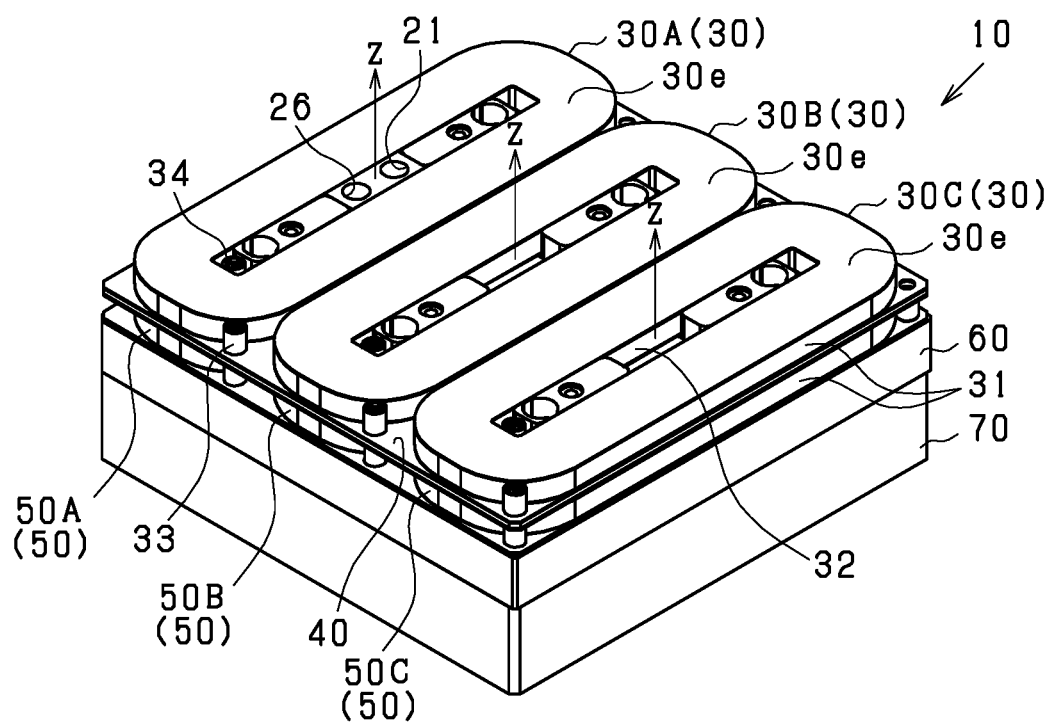
FIG. 2 is a perspective view of the coil unit as viewed before attachment of a constant-temperature plate.

As shown in FIGS. 1 and 2, a coil unit 10, which is a component of the XY linear actuator, includes a constant-temperature plate 20, first electromagnetic coils 30 (30A, 30B, 30C), a cooling plate 40, second electromagnetic coils 50 (50A, 50B, 50C), a support plate 60, and a bed 70. The coil unit 10 as a whole has the form of a rectangular parallelepiped.

Figure 3:
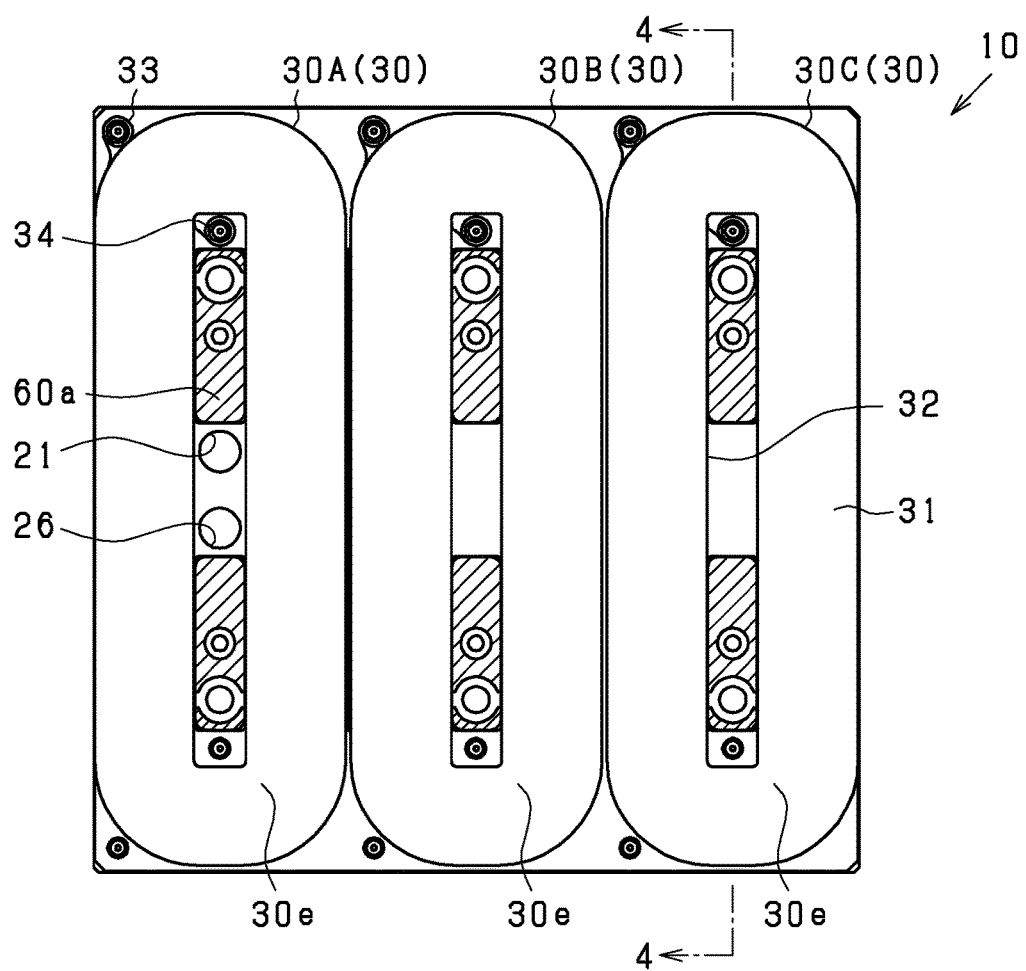
FIG. 3 is a plan view of the coil unit as viewed before attachment of the constant-temperature plate.

FIG. 3 is a plan view of the coil unit 10 as viewed before attachment of the constant-temperature plate 20. Referring to FIG. 3, the first electromagnetic coil 30 includes a conductor winding 31 formed by winding a strip (film) conductor by a plurality of turns around an axis Z (predetermined axis). One end of the strip conductor is connected to an electrode pin 33, and the other end of the strip conductor is connected to an electrode pin 34. The conductor winding 31 has the form of an elongated cylinder (cylinder). A space 32 extending in the direction of the axis Z is formed inside the conductor winding 31 (first electromagnetic coil 30). The conductor winding 31 is wound such that the strip conductor and a bond layer alternatingly overlap each other while the strip conductor layers are bonded by means of the intervening bond layer. The bond layer is formed of an electrically insulating material. The strip conductor layers can be electrically insulated from each other by means of an insulating layer rather than bonded by means of the bond layer.

The first electromagnetic coils 30A, 30B, and 30C are disposed with their axes Z disposed in parallel (juxtaposed in parallel). Specifically, the first electromagnetic coils 30A, 30B, and 30C are juxtaposed with one another in a direction in which short sides of elongated circular cross sections extend (in left-right direction in FIG. 3).

The constant-temperature plate 20 is attached to end surfaces, located opposite the second electromagnetic coils 50 with respect to the direction of the axes Z, of the first electromagnetic coils 30; specifically, to end surfaces 30e of the first electromagnetic coils 30. The constant-temperature plate 20 (first cooling member) is formed into a rectangular shape from a non-magnetic insulating material such as alumina. The constant-temperature plate 20 has a flow path for cooling water (fluid) internally formed.

The cooling plate 40 is attached to end surfaces, located toward the second electromagnetic coils 50 with respect to the direction of the axes Z, of the first electromagnetic coils 30; specifically, to end surfaces 30f of the first electromagnetic coils 30. The cooling plate 40 (second cooling member) is formed into a rectangular shape from a non-magnetic insulating material such as alumina. The second electromagnetic coils 50 are attached to the surface, located opposite the first electromagnetic coils 30, of the cooling plate 40. That is, the cooling plate 40 is attached to end surfaces, located toward the first electromagnetic coils 30, of the second electromagnetic coils 50; specifically, to end surfaces 50g of the second electromagnetic coils 50 (see FIG. 4). The cooling plate 40 has a flow path for cooling water (fluid) internally formed.

The second electromagnetic coil 50 has the same structure as that of the first electromagnetic coil 30. The first electromagnetic coils 30 and the second electromagnetic coils 50 are aligned in the direction of the axes Z. Specifically, the first electromagnetic coil 30A and the second electromagnetic coil 50A are aligned in the direction of the axis Z; the first electromagnetic coil 30B and the second electromagnetic coil 50B are aligned in the direction of the axis Z; and the first electromagnetic coil 30C and the second electromagnetic coil 50C are aligned in the direction of the axis Z.

Figure 4:
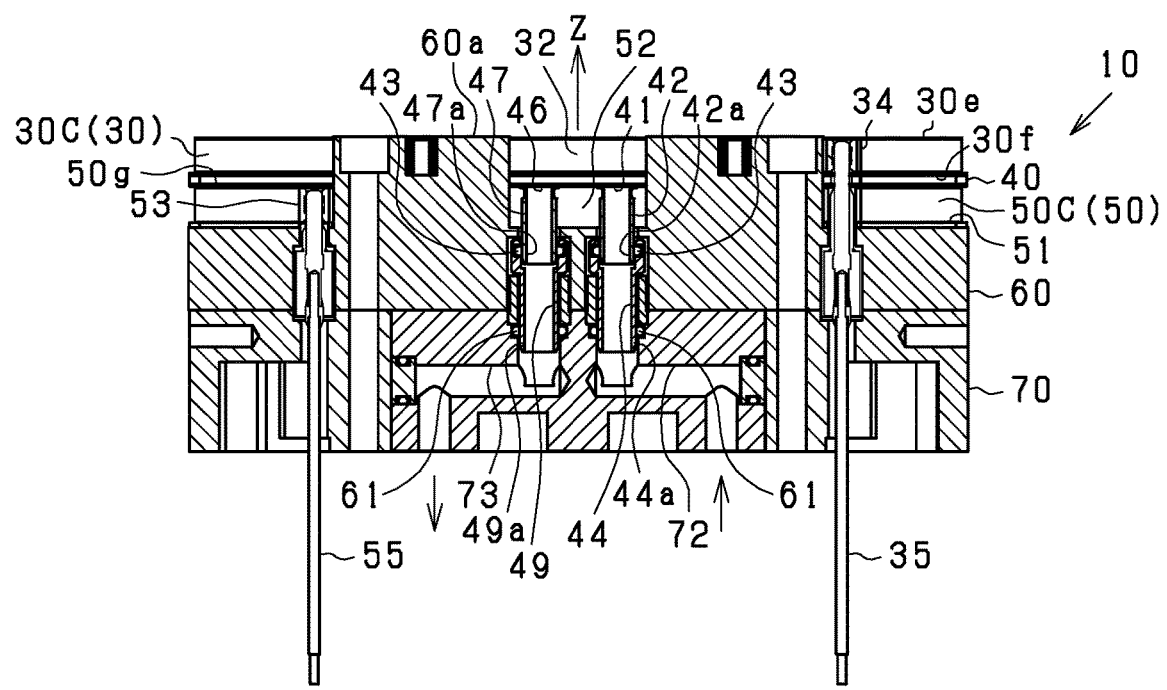
FIG. 4 is a sectional view taken along line 4-4 of FIG. 3.

FIG. 4 is a sectional view taken along line 4-4 of FIG. 3. As shown in FIG. 4, the second electromagnetic coil 50C (50) is attached to the support plate 60 through an insulating member 51. The support plate 60 is formed into a rectangular shape from a non-magnetic insulating material such as alumina. The support plate 60 has spacers 60a protruding in the direction of the axis Z. The support plate 60 is attached to the bed 70. The bed 70 is formed into a rectangular shape from metal such as stainless steel or aluminum.

Within a space 52 of the second electromagnetic coil 50C (50), a cylindrical second inlet pipe 42 is connected to an inlet 41 of the flow path of the cooling plate 40. The second inlet pipe 42 extends through the space 52 of the second electromagnetic coil 50C to a region outside the second electromagnetic coil 50C. Also, within the space 52 of the second electromagnetic coil 50C (50), a cylindrical second outlet pipe 47 is connected to an outlet 46 of the flow path of the cooling plate 40. The second outlet pipe 47 extends through the space 52 of the second electromagnetic coil 50C to the region outside the second electromagnetic coil 50C. That is, the second inlet pipe 42 and the second outlet pipe 47 are connected to the inlet 41 and the outlet 46, respectively, within the same space 52 of the second electromagnetic coil 50C.

Junction pipes 44 and 49 are connected to the outer circumferences of end portions 42a and 47a, located opposite the cooling plate 40, of the pipes 42 and 47, respectively, by means of respective first members 43. The first seal member 43 is an O-ring formed of resin or the like. The junction pipes 44 and 49 are formed into a cylindrical shape from metal such as stainless steel. Thus, the pipes 42 and 47 and the junction pipes 44 and 49 are radially sealed respectively by means of the respective first seal members 43.

The junction pipes 44 and 49 are supported, by the bed 70 through respective second seal members 61, at the outer circumferences of end portions 44a and 49a located opposite the cooling plate 40. The second seal member 61 is an O-ring formed of resin or the like. The bed 70 has flow paths 72 and 73 for cooling water internally formed. The flow paths 72 and 73 have a circular cross section. The junction pipe 44 is connected to the flow path 72, and the junction pipe 49 is connected to the flow path 73. The flow paths 72 and 73 and the junction pipes 44 and 49 are radially sealed respectively by means of the respective second seal members 61.

Electric wires 35 and 55 are connected to electrode pins 34 and 53, respectively. The electric wires 35 and 55 extend in the direction of the axis Z through the support plate 60 and through the bed 70 to a region outside the bed 70.

The second electromagnetic coil 50C (50), the cooling plate 40, the second inlet pipe 42, the second outlet pipe 47, the junction pipes 44 and 49, and the flow paths 72 and 73 constitute a cooling structure for the second electromagnetic coil 50C (50).

Figure 5:
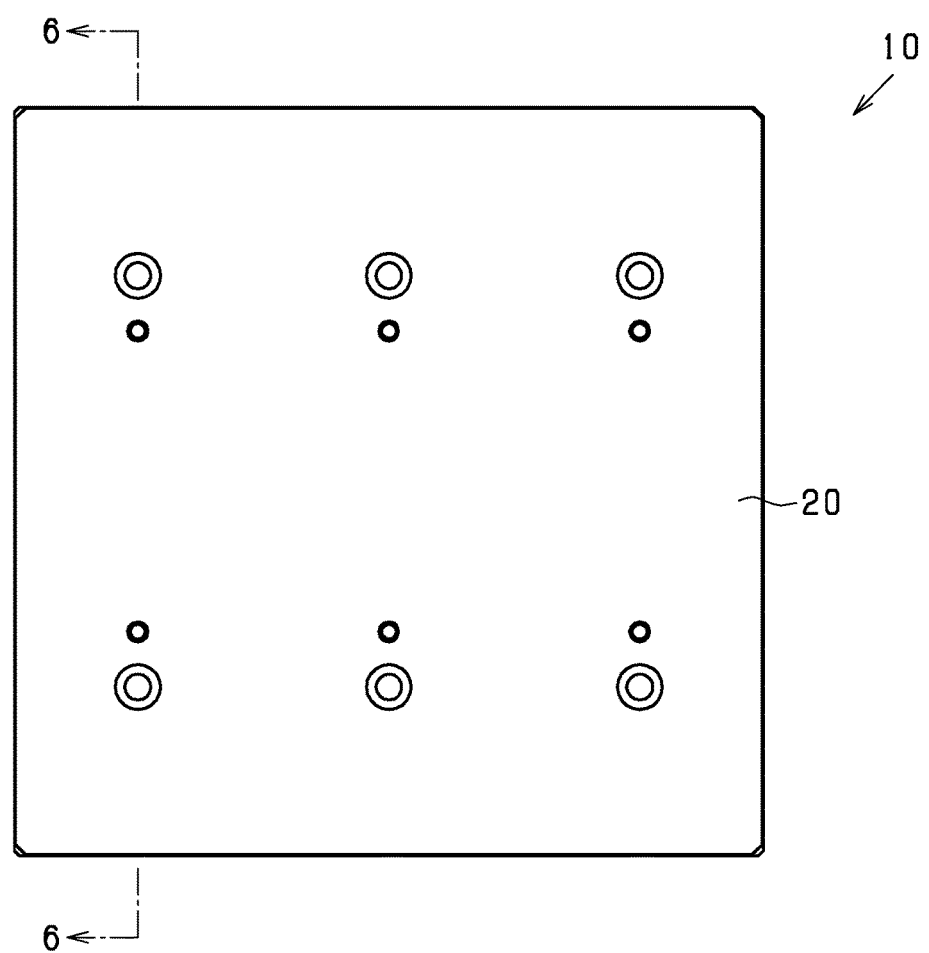
FIG. 5 is a plan view of the coil unit.
Figure 6:
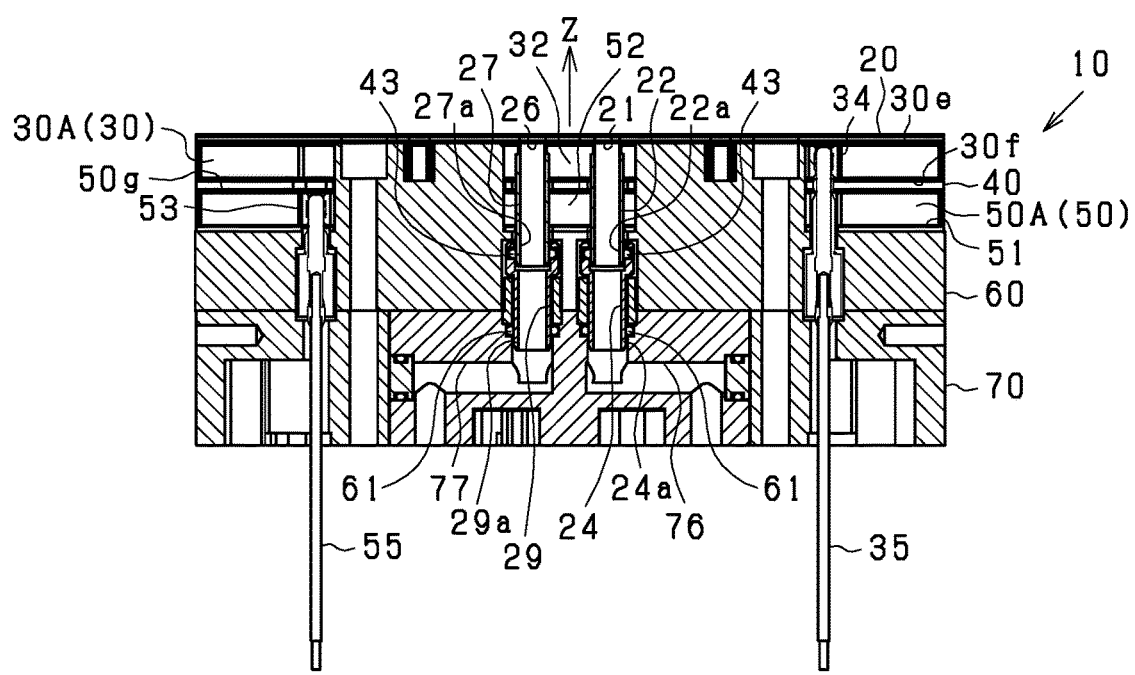
FIG. 6 is a sectional view taken along line 6-6 of FIG. 5.

FIG. 5 is a plan view of the coil unit 10, and FIG. 6 is a sectional view taken along line 6-6 of FIG. 5. As shown in FIG. 5, within the space 32 of the first electromagnetic coil 30A (30), a cylindrical first inlet pipe 22 is connected to an inlet 21 of a flow path of the constant-temperature plate 20. The first inlet pipe 22 extends through the space 32 of the first electromagnetic coil 30A, through the cooling plate 40, and through the space 52 of the second electromagnetic coil 50A to a region outside the second electromagnetic coil 50A. Also, within the space 32 of the first electromagnetic coil 30A (30), a cylindrical first outlet pipe 27 is connected to an outlet 26 of the flow path of the constant-temperature plate 20. The first outlet pipe 27 extends through the space 32 of the first electromagnetic coil 30A, through the cooling plate 40, and through the space 52 of the second electromagnetic coil 50A to the region outside the second electromagnetic coil 50A. That is, the first inlet pipe 22 and the first outlet pipe 27 are connected to the inlet 21 and the outlet 26, respectively, within the same space 32 of the first electromagnetic coil 30A.

Junction pipes 24 and 29 are connected to the outer circumferences of end portions 22a and 27a, located opposite the constant-temperature plate 20, of the pipes 22 and 27, respectively, by means of the respective first seal members 43. The junction pipes 24 and 29 are formed into a cylindrical shape from metal such as stainless steel. Thus, the pipes 22 and 27 and the junction pipes 24 and 29 are radially sealed respectively by means of the respective first seal members 43.

The junction pipes 24 and 29 are supported, by the bed 70 through the respective second seal members 61, at the outer circumferences of end portions 24a and 29a thereof located opposite the constant-temperature plate 20. The bed 70 has flow paths 76 and 77 for cooling water internally formed. The flow paths 76 and 77 have a circular cross section. The junction pipe 24 is connected to the flow path 76, and the junction pipe 29 is connected to the flow path 77. The flow paths 76 and 77 and the junction pipes 24 and 29 are radially sealed respectively by means of the respective second seal members 61.

The electric wires 35 and 55 are connected to the electrode pins 34 and 53, respectively. The electric wires 35 and 55 extend in the direction of the axis Z through the support plate 60 and through the bed 70 to the region outside the bed 70.

The first electromagnetic coil 30A (30), the constant-temperature plate 20, the first inlet pipe 22, the first outlet pipe 27, the junction pipes 24 and 29, and the flow paths 76 and 77 constitute a cooling structure for the first electromagnetic coil 30A (30).

Figure 7:
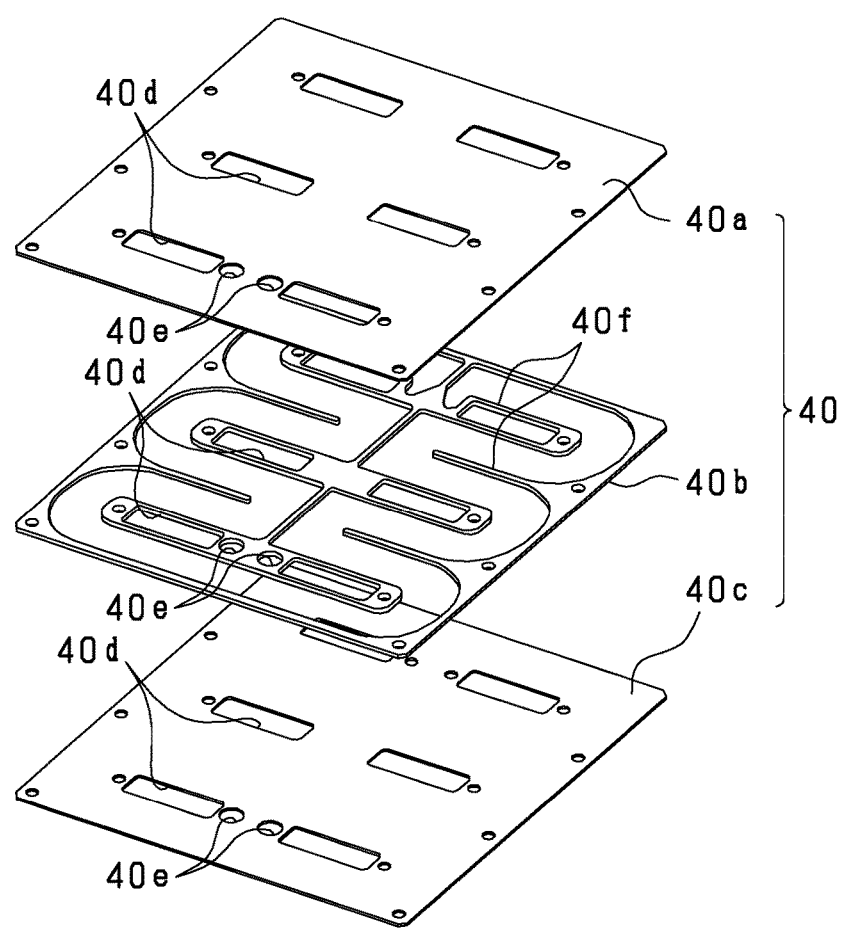
FIG. 7 is an exploded view of a cooling plate.
Figure 8:
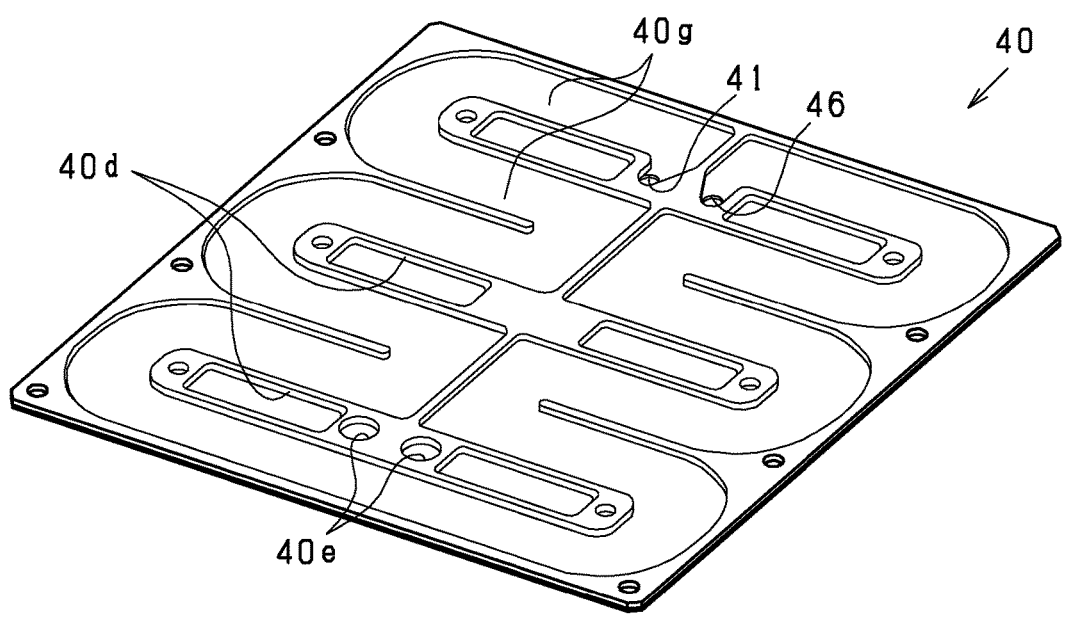
FIG. 8 is a perspective view of the cooling plate as viewed before attachment of an upper plate.

FIG. 7 is an exploded view of the cooling plate 40, and FIG. 8 is a perspective view of the cooling plate 40 before attachment of an upper plate. As shown in FIG. 7, the cooling plate 40 includes an upper plate 40a, a middle plate 40b, and a lower plate 40c.

The upper plate 40a, the middle plate 40b, and the lower plate 40c have respective rectangular plate-like shapes of the same size. The upper plate 40a, the middle plate 40b, and the lower plate 40c have through holes 40d internally formed for receiving the respective spacers 60a of the support plate 60. The upper plate 40a, the middle plate 40b, and the lower plate 40c have through holes 40e internally formed for allowing the pipes 22 and 27 to extend through the plates respectively. The through holes 40e are formed at positions corresponding to the space 52 of the second electromagnetic coil 50A.

The middle plate 40b has a meandering through hole 40f internally formed for partially defining a flow path 40g of the cooling plate 40. The upper plate 40a and the lower plate 40c are united together with the middle plate 40b held therebetween, thereby forming the flow path 40g of the cooling plate 40. The lower plate 40c has the inlet 41 and the outlet 46 of the flow path 40g internally formed. The inlet 41 and the outlet 46 are formed at positions corresponding to the space 52 of the second electromagnetic coil 50C.

Figure 9:
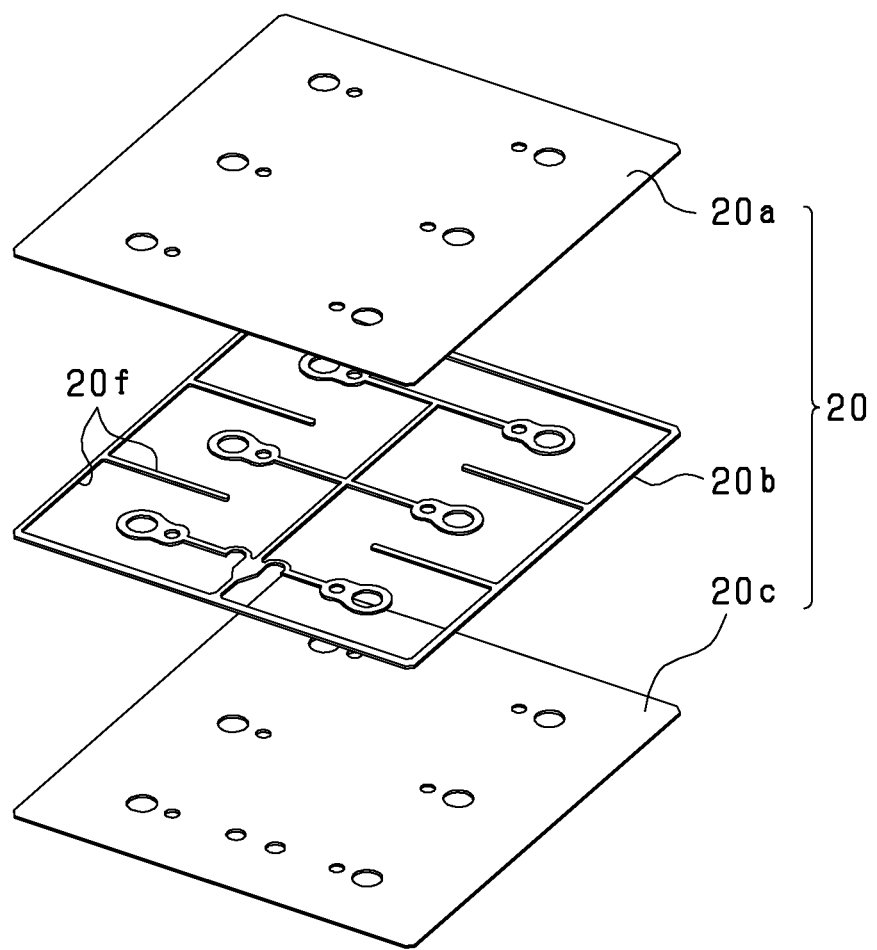
FIG. 9 is an exploded view of the constant-temperature plate.
Figure 10:
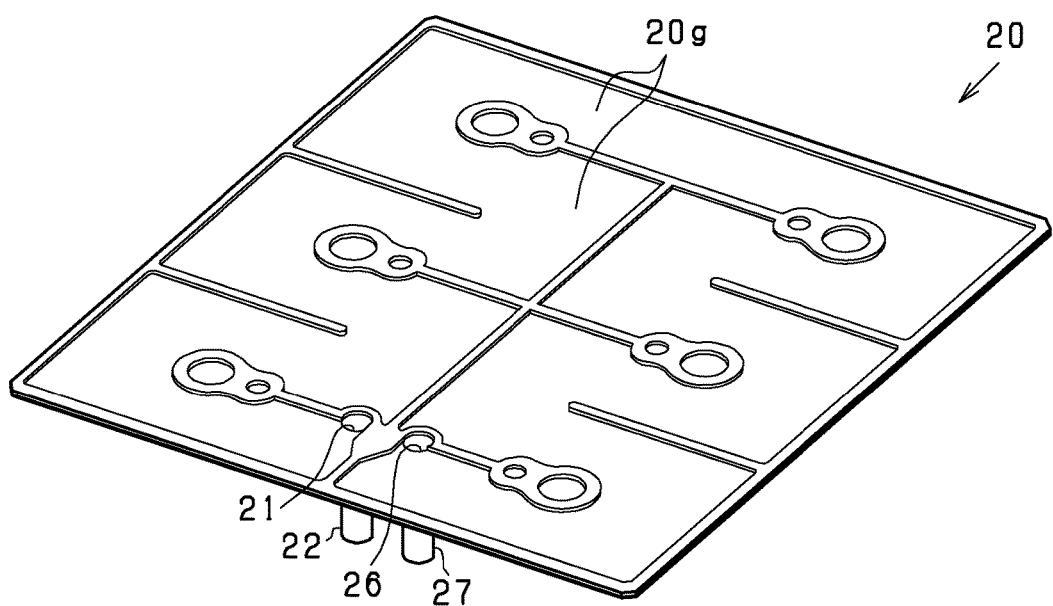
FIG. 10 is a perspective view of the constant-temperature plate as viewed before attachment of the upper plate.

FIG. 9 is an exploded view of the constant-temperature plate 20, and FIG. 10 is a perspective view of the constant-temperature plate 20 as viewed before attachment of an upper plate. As shown in FIG. 9, the constant-temperature plate 20 includes an upper plate 20a, a middle plate 20b, and a lower plate 20c.

The upper plate 20a, the middle plate 20b, and the lower plate 20c have respective rectangular plate-like shapes of the same size.

The middle plate 20b has a meandering through hole 20f internally formed for partially defining a flow path 20g of the constant-temperature plate 20. The upper plate 20a and the lower plate 20c are united together with the middle plate 20b held therebetween, thereby forming the flow path 20g of the constant-temperature plate 20. The lower plate 20c has the inlet 21 and the outlet 26 of the flow path 20g internally formed. The inlet 21 and the outlet 26 are formed at positions corresponding to the space 32 of the first electromagnetic coil 30A.

Figure 11:
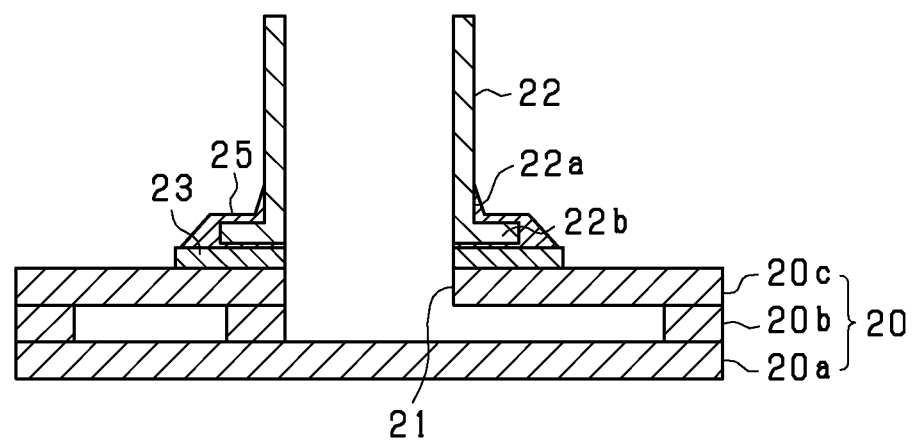
FIG. 11 is a sectional view showing the structure of connection of a first inlet pipe.

FIG. 11 is a sectional view showing the structure of connection of the first inlet pipe 22. The pipes 22, 27, 42, and 47 are formed of titanium and have similar respective structures of connection. Herein, the structure of connection of the first inlet pipe 22 is described by way of example.

The lower plate 20c of the constant-temperature plate 20 has a metal layer 23 formed through diffusion of a metal material in a region around the inlet 21 of the flow path 20g. The metal layer 23 is formed of silver, copper and titanium. The end portion 22a of the first inlet pipe 22 has a flange 22b formed thereat. The flange 22b of the first inlet pipe 22 is brought into contact with the metal layer 23; then, the metal layer 23 and the first pipe 22 are connected by means of silver solder 25. That is, the first inlet pipe 22 is connected to the constant-temperature plate 20 by means of the metal layer 23 by means of the silver solder 25.

Figure 12:
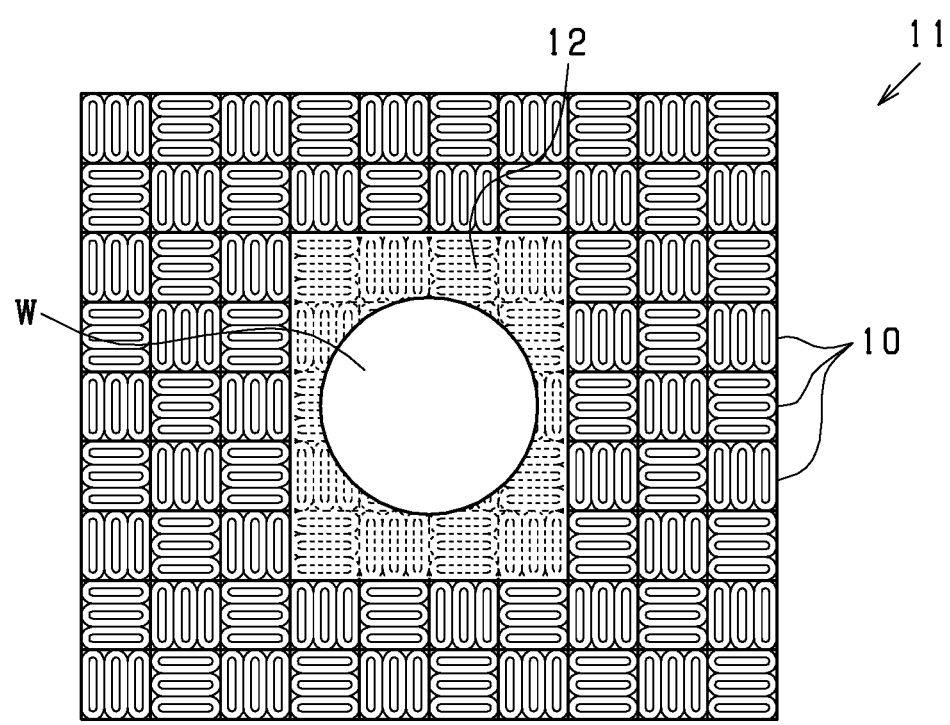
FIG. 12 is a schematic view showing an XY linear actuator.

FIG. 12 is a schematic view showing an XY linear actuator 11. As shown in FIG. 12, the XY linear actuator 11 (electromagnetic actuator) includes a plurality of coil units 10 disposed in a two-dimensional manner. The plurality of coil units 10 are disposed such that the mutually adjacent coil units 10 are oriented 90☐ different from each other. FIG. 12 shows the coil units 10 with their constant-temperature plates 20 removed.

The XY linear actuator 11 has a table 12 disposed opposite the electromagnetic coils 30 and 50 with respect to the constant-temperature plates 20. The table 12 (driven member) is formed into a rectangular plate-like shape and has a magnet internally incorporated. A wafer W is attached on the table 12. The table 12 is two-dimensionally driven along the constant-temperature plates 20 in response to magnetic fluxes generated in the electromagnetic coils 30 and 50.

The present embodiment described in detail above has the following advantages.

Within the space 32 of the first electromagnetic coil 30A, the first inlet pipe 22 and the first outlet pipe 27 are connected to the inlet 21 and the outlet 26, respectively, of the flow path 20g of the constant-temperature plate 20. Also, the first inlet pipe 22 and the first outlet pipe 27 extend through the space 32 to a region outside the first electromagnetic coil 30A. Thus, by utilization of the space 32 formed inside the first electromagnetic coil 30A, the first inlet pipe 22 and the first outlet pipe 27 are connected to the inlet 21 and the outlet 26, respectively, of the flow path 20g of the constant-temperature plate 20, whereby cooling water can be flowed through the flow path 20g. Therefore, a plurality of the first electromagnetic coils 30 can be arbitrarily disposed in parallel without involvement of mutual interference of the pipes of the first electromagnetic coils 30.

A plurality of the first electromagnetic coils 30 are disposed with their axes Z juxtaposed in parallel, and the constant-temperature plate 20 is attached to the end surfaces 30e, with respect to the direction of the axes Z, of the first electromagnetic coils 30. Furthermore, the first inlet pipe 22 is connected, within the space 32 of the first electromagnetic coil 30A among the first electromagnetic coils 30, to the first inlet 21 of the flow path 20g of the constant-temperature plate 20, and the first outlet pipe 27 is connected, within the space 32 of the first electromagnetic coil 30A, to the outlet 26 of the flow path 20g of the constant-temperature plate 20. Thus, by flowing fluid through the flow path 20g of the constant-temperature plate 20, the plurality of first electromagnetic coils 30 can be cooled.

The first inlet pipe 22 and the first outlet pipe 27 are connected to the inlet 21 and the outlet 26, respectively, within the same space 32 of the first electromagnetic coil 30A. Thus, the first inlet pipe 22 and the first outlet pipe 27 can be disposed within the single first electromagnetic coil 30A among the plurality of first electromagnetic coils 30 disposed with their axes Z juxtaposed in parallel.

The first electromagnetic coil 30 and the second electromagnetic coil 50 having the respective spaces 32 and 52, extending in the direction of the axis Z, formed inside the same are aligned with the direction of the axis Z. In addition to the constant-temperature plate 20, the cooling plate 40 is provided between the first electromagnetic coil 30 and the second electromagnetic coil 50. Furthermore, by utilization of the inside spaces 32 and 52 of the first electromagnetic coil 30 and the second electromagnetic coil 50, the first inlet pipe 22 and the first outlet pipe 27 can be connected to the inlet 21 and the outlet 26, respectively, of the flow path 20g of the constant-temperature plate 20 while extending through the cooling plate 40. Thus, even in the case of a configuration in which the first electromagnetic coil 30 and the second electromagnetic coil 50 are aligned in the direction of the axis Z, a plurality of groups each consisting of the first electromagnetic coil 30 and the second electromagnetic coil 50 can be arbitrarily disposed in parallel.

The present embodiment includes the second inlet pipe 42 and the second outlet pipe 47 connected, within the space 52 of the second electromagnetic coil 50C, to the inlet 41 and the outlet 46, respectively, of the flow path 40g of the cooling plate 40 and extending through the space 52 of the second electromagnetic coil 50C to the region outside the second electromagnetic coil 50C. Thus, even in a configuration in which the first electromagnetic coil 30C and the second electromagnetic coil 50C are aligned in the direction of the axis Z, cooling water can be flowed to the constant-temperature plate 20 and to the cooling plate 40.

Even in a configuration in which a plurality of the first electromagnetic coils 30 are disposed with their axes Z juxtaposed in parallel, and the first electromagnetic coils 30 and the second electromagnetic coils 50 are aligned in the direction of the axes Z, cooling water can be flowed to the constant-temperature-plate 20 and to the cooling plate 40.

The junction pipe 24 is connected, by means of the first seal member 43, to the outer circumference of the end portion 22a, located opposite the constant-temperature plate 20, of the first inlet pipe 22. Also, the junction pipe 24 is supported, by the bed 70 through the second seal member 61, at the outer circumference of the end portion 24a thereof located opposite the constant-temperature plate 20. Thus, force imposed on the first inlet pipe 22 can be mitigated by the first seal member 43, the junction pipe 24 and the second seal member 61, thereby restraining imposition of load on the connection between the constant-temperature plate 20 and the first inlet pipe 22. Furthermore, since the first seal member 43 and the second seal member 61 allow some movement of the first inlet pipe 22 and the junction pipe 24, errors in connecting the first inlet pipe 22 and in connecting the junction pipe 24 can be absorbed. Similar effects can also be yielded in the case of the first outlet pipe 27, the second inlet pipe 42 and the second outlet pipe 47.

The constant-temperature plate 20 is formed of alumina, and the first inlet pipe 22 (first outlet pipe 27) is formed of titanium. Since alumina and titanium are non-magnetic materials, the constant-temperature plate 20 and the first inlet pipe 22 (first outlet pipe 27) can be restrained from affecting magnetic fluxes generated in the electromagnetic coils. Furthermore, the metal layer 23 diffusion-formed on the surface of the constant-temperature plate 20 allows the first inlet pipe 22 (first outlet pipe 27) of titanium to be connected to the constant-temperature plate 20 of alumina by means of the silver solder 25. Similar effects can also be yielded in the case of the cooling plate 40 and the second inlet pipe 42 (second outlet pipe 47).

The first electromagnetic coil 30 includes a conductor winding 31 formed by winding a strip conductor by a plurality of turns around the axis Z. The constant-temperature plate 20 is attached to the end surface 30e, with respect to the direction of the axis Z, of the conductor winding 31. Thus, the conductor winding 31 can transmit heat, along the entire length in the direction of the axis Z, from its end surface 30e to the constant-temperature plate 20, whereby the cooling efficiency of the conductor winding 31 can be improved. Also, the cooling plate 40 is attached to the end surface 30f, with respect to the direction of the axis Z, of the conductor winding 31. Thus, the conductor winding 31 can also transmit heat, along the entire length in the direction of the axis Z, from its end surface 30f to the cooling plate 40. Similar effects can also be yielded in the case of the second electromagnetic coil 50, the cooling plate 40, and the support plate 60.

The constant-temperature plates 20 can restrain variation of temperature of space above the constant-temperature plates 20 in the XY linear actuator 11; i.e., variation of temperature of a processing chamber (e.g., exposure space) in a lithographic apparatus. In this case, the constant-temperature plates 20 and the first electromagnetic coils 30 can be disposed apart in the direction of the axis Z such that an air layer as a thermally insulating layer intervenes therebetween. In place of the air layer, a thermally insulating member may be disposed between the constant-temperature plates 20 and the first electromagnetic coils 30. Alternatively, a bonding agent used to bond the constant-temperature plates 20 and the first electromagnetic coils 30 may be rendered greater in thickness than a bonding agent used to bond the cooling plates 40 to the first electromagnetic coils 30 and to the second electromagnetic coils 50 so as to impose difficulty on transmission of heat of the electromagnetic coils to the constant-temperature plates 20. In any of the above configurations, by means of independently adjusting temperature, flow rate, etc., of cooling water (coolant) which flows through the cooling plates 40, and temperature, flow rate, etc., of cooling water (coolant) which flows through the constant-temperature plates 20, the cooling plates 40 can efficiently remove heat from the first electromagnetic coils 30 and from the second electromagnetic coils 50, and the constant-temperature plates 20 can restrain variation of temperature of a processing chamber in the lithographic apparatus.

The XY linear actuator 11 includes the table 12 which is disposed opposite the first electromagnetic coils 30 and the second electromagnetic coils 50 with respect to the constant-temperature plates 20 and is two-dimensionally driven along the constant-temperature plates 20 in response to magnetic fluxes generated in the first electromagnetic coils 30 and the second electromagnetic coils 50. Thus, the first inlet pipes 22 (second inlet pipes 42) and the first outlet pipes 27 (second outlet pipes 47) for flowing cooling water through the corresponding constant-temperature plates 20 (cooling plates 40) cannot be connected to the constant-temperature plates 20 (cooling plates 40) at any side positions thereof. Also, the first inlet pipes 22 (second inlet pipes 42) and the first outlet pipes 27 (second outlet pipes 47) cannot be connected to the constant-temperature plates 20 (cooling plates 40) at any positions located opposite the first electromagnetic coils 30 and the second electromagnetic coils 50. In this connection, since the first electromagnetic coils 30 and the second electromagnetic coils 50 have the above-mentioned cooling structure, even the thus-configured XY linear actuator 11 allows cooling water to flow through the constant-temperature plates 20 (cooling plates 40).

The embodiment described above can be modified as follows.

The sectional shapes of the first electromagnetic coil 30 and the second electromagnetic coil 50 are not limited to an elongated circular shape, but can be modified to a circular shape or a polygonal shape. That is, the shapes of the first electromagnetic coil 30 and the second electromagnetic coil 50 are not limited to an elongated cylindrical shape, but can be modified to a cylindrical shape or a polygonally tubular shape.

The shapes of the flow path 20g of the constant-temperature plate 20 and the flow path 20g of the cooling plate 40 can be modified arbitrarily according to heat-generating characteristics of the first electromagnetic coil 30 and the second electromagnetic coil 50. Also, the shapes of the constant-temperature plate 20 and the cooling plate 40 can also be modified according to heat-generating characteristics of the first electromagnetic coil 30 and the second electromagnetic coil 50.

The first inlet pipe 22 and the first outlet pipe 27 can be connected respectively to the inlet of the flow path 20g of the constant-temperature plate 20 within the space 32 of a certain first electromagnetic coil 30 and to the outlet of the flow path 20g of the constant-temperature plate 20 within the space 32 of another first electromagnetic coil 30. In this case, the positions of the inlet and the outlet of the flow path 20g of the constant-temperature plate 20 may be modified accordingly.

The second inlet pipe 42 and the second outlet pipe 47 can be connected respectively to the inlet of the flow path 40g of the cooling plate 40 within the space 52 of a certain second electromagnetic coil 50 and to the outlet of the flow path 40g of the cooling plate 40 within the space 52 of another second electromagnetic coil 50. In this case, the positions of the inlet and the outlet of the flow path 40g of the cooling plate 40 may be modified accordingly.

Only either one of the first electromagnetic coil 30 and the second electromagnetic coil 50 can be provided. In this case, a structural feature corresponding to the removed electromagnetic coil may be removed.

Material used to form the constant-temperature plate 20 and the cooling plate 40 is not limited to alumina, but other ceramics, etc., can be used.

Material used to form the first inlet pipe 22, the first outlet pipe 27, the second inlet pipe 42, and the second outlet pipe 47 is not limited to titanium, but other metals, etc., can be used.

Material used to form the conductor winding 31 is not limited to a strip (film) conductor, but a round wire having a circular cross section, a rectangular wire having a rectangular cross section, etc., can be used.

The above-described cooling structure for the first electromagnetic coil 30 and the second electromagnetic coil 50 can be applied not only to the XY linear actuator 11, but also to an electromagnetic actuator in which the first electromagnetic coil 30 and the second electromagnetic coil 50 have the spaces 32 and 52, respectively, internally formed. The cooling structure can be applied not only to a lithographic apparatus, but also to an apparatus having such an electromagnetic actuator.

What is claimed is:

1. A cooling structure for an electromagnetic coil, comprising:
    a first electromagnetic coil having:
        a first axis in a predetermined direction;
        a first space extending in the predetermined direction;
        a first end surface on one side of the first electromagnetic coil with respect to the predetermined direction; and
        a second end surface on the other side of the first electromagnetic coil with respect to the predetermined direction;
    a second electromagnetic coil aligned with the first electromagnetic coil, the second electromagnetic coil having:
        a second axis in the predetermined direction and aligned with the first axis;
        a second space extending in the predetermined direction and aligned with the first space;
        a third end surface on one side of the second electromagnetic coil adjacent to the second end surface of the first electromagnetic coil; and
        a fourth end surface on the other side of the second electromagnetic coil with respect to the predetermined direction;
    a first cooling member attached to the first end surface of the first electromagnetic coil, the first cooling member having a first flow path for fluid formed therein;
    a second cooling member attached to the second end surface of the first electromagnetic coil and to the third end surface of the second electromagnetic coil, the second cooling member having a second flow path for fluid formed therein;
    a first inlet pipe and a first outlet pipe connected, within the first space of the first electromagnetic coil, to an inlet and an outlet of the first flow path of the first cooling member, respectively, and extending through the first space, the second cooling member, and the second space of the second electromagnetic coil to a region outside the second electromagnetic coil; and
    a second inlet pipe and a second outlet pipe connected, within the second space of the second electromagnetic coil, to an inlet and an outlet of the second flow path of the second cooling member, respectively, and extending through the second space to a region outside the second electromagnetic coil.

2. The cooling structure for an electromagnetic coil according to claim 1 further comprising:
    an inlet junction pipe and an outlet junction pipe having respective first end portions connected, by means of respective first seal members, to outer circumferences of respective distal end portion of the first inlet pipe and the first outlet pipe, the distal end portions being end portions away from the first cooling member, respective second end portions of the inlet junction pipe and the outlet junction pipe opposite to the respective first end portions being is supported, by means of respective second seal members member.

3. The cooling structure for an electromagnetic coil according to claim 1,
    wherein the first cooling member and the second cooling member are formed of alumina,
    wherein the first inlet and first outlet pipes, and the second inlet and second outlet pipes are formed of titanium, and
    wherein the cooling structure further comprises a diffusion-formed metal layer disposed on a surface of the first cooling member, the first inlet pipe being silver-soldered to the metal layer of the first cooling member.

4. The cooling structure for an electromagnetic coil according to claim 1, wherein the first and second electromagnetic coils comprise respective conductor windings formed by winding a strip conductor by a plurality of turns around the first and second axes, respectively.

5. The electromagnetic actuator comprising a plurality of coil units each including the cooling structure for an electromagnetic coil according to claim 1.

6. The electromagnetic actuator according to claim 5, further comprising:
    a driven member which is disposed opposite the first and second electromagnetic coils with respect to the first cooling members, the driven member being two-dimensionally driven along the first cooling members in response to magnetic fluxes generated in the first and second electromagnetic coils.

7. A cooling structure for an electromagnetic coil, comprising:
    a plurality of first electromagnetic coils each having:
        a first axis in a predetermined direction, the plurality of first electromagnetic coils being disposed such that the first axes thereof are arranged in parallel to one another;
        a first space extending in the predetermined direction;
        a first end surface on one side of the first electromagnetic coil with respect to the predetermined direction; and a second end surface on the other side of the first electromagnetic coil with respect to the predetermined direction;

a plurality of second electromagnetic coils aligned with the plurality of first electromagnetic coils, each second electromagnetic coil having:
- a second axis in the predetermined direction and aligned with the first axis of corresponding one of the first electromagnetic coils;
- a second space extending in the predetermined direction and aligned with the first space of the corresponding first electromagnetic coil;
- a third end surface on one side of the second electromagnetic coil adjacent to the second end surface of the corresponding first electromagnetic coil; and
- a fourth end surface on the other side of the second electromagnetic coil with respect to the predetermined direction;

a first cooling member attached to the first end surfaces of the plurality of first electromagnetic coils, the first cooling member having a first flow path for fluid formed therein;

a second cooling member attached to the second end surfaces of the plurality of first electromagnetic coils and to the third end surfaces of the plurality of second electromagnetic coils, the second cooling member having a second flow path for fluid formed therein;

a first inlet pipe and a first outlet pipe connected, within the first space of one of the plurality of first electromagnetic coils, to an inlet and outlet of the first flow path of the first cooling member, respectively, and extending through the first space of the first electromagnetic coil, the second cooling member, and the second space of corresponding one of the second electromagnetic coils, to a region outside the second electromagnetic coil;

a second inlet pipe and a second outlet pipe connected, within the second space of one of the plurality of second electromagnetic coils, to an inlet and an outlet of the second flow path of the second cooling member, respectively, and extending through the second space of the second electromagnetic coil to a region outside the second electromagnetic coil.

8. The cooling structure for an electromagnetic coil according to claim 7, further comprising:
an inlet junction pipe and an outlet junction pipe having respective first end portions connected, by means of respective first seal members, to outer circumferences of respective distal end portions of the first inlet pipe and the first outlet pipe, the distal end portions being end portions away from the first cooling member, respective second end portions of the inlet junction pipe and the outlet junction pipe opposite to the first end portions being supported by respective second seal members.

9. The cooling structure for an electromagnetic coil according to claim 7,
wherein the first cooling member and the second cooling member are formed of alumina,
wherein the first inlet and first outlet pipes, and the second inlet and second outlet pipes are formed of titanium, and
wherein the cooling structure further comprises a diffusion-formed metal layer disposed on a surface of the first cooling member, the first inlet pipe being silver-soldered to the metal layer of the first cooling member.

10. The cooling structure for an electromagnetic coil according to claim 7, wherein the first and second electromagnetic coils comprise respective conductor windings formed by winding a strip conductor by a plurality of turns around the first and second axes, respectively.

11. The electromagnetic actuator comprising a plurality of coil units each including the cooling structure for an electromagnetic coil according to claim 7.

12. The electromagnetic actuator according to claim 11, further comprising:
a driven member which is disposed opposite to the first and second electromagnetic coils with respect to the first cooling members, the driven member being two-dimensionally driven along the first cooling members in response to magnetic fluxes generated in the first and second electromagnetic coils.

* * * * *